(12) United States Patent
Dupree

(10) Patent No.: US 8,898,690 B2
(45) Date of Patent: Nov. 25, 2014

(54) APPARATUS AND METHOD FOR MANAGING MEDIA CONTENT

(75) Inventor: Jesse James Dupree, Kennesaw, GA (US)

(73) Assignee: BBS Media, Kennesaw, GA (US)

( * ) Notice: Subject to any disclaimer, the term of this patent is extended or adjusted under 35 U.S.C. 154(b) by 911 days.

(21) Appl. No.: 11/927,838

(22) Filed: Oct. 30, 2007

(65) Prior Publication Data

US 2009/0113467 A1   Apr. 30, 2009

(51) Int. Cl.
*H04N 7/16* (2011.01)
*H04N 21/258* (2011.01)
*H04N 21/254* (2011.01)
*H04N 21/414* (2011.01)
*H04N 21/4784* (2011.01)
*H04N 21/4788* (2011.01)
*H04N 7/173* (2011.01)
*H04N 21/475* (2011.01)
*H04N 21/478* (2011.01)

(52) U.S. Cl.
CPC ..... *H04N 7/17318* (2013.01); *H04N 21/25891* (2013.01); *H04N 21/254* (2013.01); *H04N 21/41407* (2013.01); *H04N 60/33* (2013.01); *H04N 21/4784* (2013.01); *H04N 21/4788* (2013.01); *H04N 21/4756* (2013.01); *H04N 21/47815* (2013.01)
USPC ......................................................... 725/23

(58) Field of Classification Search
USPC ......................................................... 725/23
See application file for complete search history.

(56) References Cited

U.S. PATENT DOCUMENTS

| | | | |
|---|---|---|---|
| 6,298,482 B1 * | 10/2001 | Seidman et al. | 725/101 |
| 6,891,811 B1 | 5/2005 | Smith et al. | |
| 7,355,990 B2 | 4/2008 | Smith et al. | |
| 8,042,050 B2 * | 10/2011 | Cliff et al. | 715/757 |
| 2002/0046138 A1 | 4/2002 | Fitzpatrick et al. | |
| 2002/0116266 A1 | 8/2002 | Marshall | |
| 2002/0199194 A1 * | 12/2002 | Ali | 725/46 |
| 2003/0187739 A1 * | 10/2003 | Powers | 705/14 |
| 2005/0039206 A1 | 2/2005 | Opdycke | 725/35 |

(Continued)

OTHER PUBLICATIONS

Sutel, Seth "Pager-like Device Tracks Radio Audiences" The Palm Beach Post, Oct. 14, 2007 p. 5F.

*Primary Examiner* — John Schnurr
*Assistant Examiner* — Christine Kurien
(74) *Attorney, Agent, or Firm* — Akerman LLP

(57) ABSTRACT

A system that incorporates teachings of the present disclosure may include, for example, a media server and parsing engine, $3^{rd}$ party mobile aggregator, client servers, and a plurality of communication devices that are each associated with a user and a user profile. The media server can provide one or more of the plurality of communication devices with access to media content, with the access being provided at a time selected by the user. At least one of the one or more of the plurality of communication devices can transmit a critique of the media content. The media server can award points to the user based on performing the critique, and can transmit the critique and user information from the user profile to the client server. The media server can provide the at least one of the one or more of the plurality of communication devices with access to at least one of services or goods to be purchased with the points. The media server can redeem the points based on a purchase of the at least one of the services or goods using the points. Other embodiments such as the obtaining of end user preferences of content in a natural environment are disclosed.

11 Claims, 5 Drawing Sheets

(56) References Cited

U.S. PATENT DOCUMENTS

| | | | |
|---|---|---|---|
| 2005/0149964 A1* | 7/2005 | Thomas et al. | 725/9 |
| 2006/0129458 A1 | 6/2006 | Maggio | |
| 2007/0155427 A1* | 7/2007 | Tran | 455/556.2 |
| 2007/0192784 A1 | 8/2007 | Postrel | 725/23 |
| 2007/0214049 A1* | 9/2007 | Postrel | 705/14 |
| 2007/0283398 A1* | 12/2007 | Bowles | 725/86 |
| 2008/0207182 A1 | 8/2008 | Maharajh et al. | |
| 2008/0209462 A1 | 8/2008 | Rodov | 725/4 |
| 2009/0083779 A1* | 3/2009 | Shteyn et al. | 725/14 |

* cited by examiner

APPARATUS AND METHOD FOR MANAGING MEDIA CONTENT

FIELD OF THE DISCLOSURE

The present disclosure relates generally to communication services and more specifically to an apparatus and method for managing media content.

BACKGROUND

Media content, including music, movies, television programming, video-on-demand and video games, is becoming increasingly accessible to the masses. Consumers can download or otherwise access media content from media sources, such as music or movies from ITUNES® or programming from a cable service provider. Distribution and/or accessability of the media content can be based on a number of factors, including popularity of the content and hardware constraints of the media source. For example, a television station often desires to provide programming that will attract the most viewers so that it can maintain its advertising revenue. As another example, a cable service provider often desires to provide access to a set of movies through video-on-demand that are most popular so that it can maintain its subscribers while reducing the cost of storing unpopular movies. These are examples of how new media is changing the way that the public interacts with content and creates a fragmentation for sources of obtaining content.

The media sources, as well as advertisers, businesses associated with the media content (e.g., retailers selling movie memorabilia, producers of the content itself) and other businesses, often desire to know the consumers' opinions regarding the media content so that they can manage their business accordingly. For example, a radio station often desires to know that a particular song is not well liked so that they can minimize or eliminate the song from their programming to avoid listeners tuning to a different station. As another example, an advertising agency or a business seeking advertising often desires an accurate assessment of whether a television program is being watched by a large amount of viewers so they can accurately assess the value of the advertising.

Contemporary methods of obtaining feedback with respect to media content, including evaluations and audience numbers, are limited, and can be costly and inaccurate. Focus groups are costly, and typically provide for review of large numbers of media content in a sterile environment. Callout research involves receiving a phone call over your home telephone, and evaluating a portion of a song immediately, regardless if it matches your taste/preference for that genre of music. These research methods can be flawed for a number of reasons, including the lack of natural environment for the review of the media content. Additionally, audience demographics are often based on sampling that may not accurately reflect the true audience due to a number of reasons, including the sample size or the sampling methodology.

A need therefore arises for effectively managing media content, and an apparatus and method for managing the media content. A further need arises for such an apparatus and method to include a record of audience preferences for likes and dislikes of the media content.

SUMMARY

The Summary is provided to comply with 37 C.F.R. §1.73, requiring a summary of the invention briefly indicating the nature and substance of the invention. It is submitted with the understanding that it will not be used to interpret or limit the scope or meaning of the claims.

In one embodiment of the present disclosure, a storage medium for managing media content can include computer instructions for: providing a user of a communication device with limited access to media content, where the limited access is provided at a time selected by the user; receiving a critique of the media content from the user; awarding points to the user based on performing the critique; providing the critique to at least one of an originator and distributor associated with the media content; providing access to at least one of services or goods to be purchased with the points; and redeeming the points based on a purchase of the at least one of the services or goods.

In another embodiment of the present disclosure, a media management system can include a media server, and a client server, as well as a plurality of communication devices that are each associated with a user and a user profile. The media server can provide one or more of the plurality of communication devices with access to media content, with the access being provided at a time selected by the user. At least one of the one or more of the plurality of communication devices can transmit a critique of the media content. The media server can award points to the user based on performing the critique, and can transmit the critique and user information from the user profile to the client server. The media server can provide the at least one of the one or more of the plurality of communication devices with access to at least one of services or goods to be purchased with the points. The media server can redeem the points based on a purchase of the at least one of the services or goods using the points.

In another embodiment of the present disclosure, a method for managing media content can include providing a user of a communication device with access to media content; obtaining a critique of the media content from the user; awarding points to the user based on performing the critique; providing the critique to a client associated with the media content; providing access to at least one of services or goods to be purchased with the points; and redeeming the points based on a purchase by the user of the at least one of the services or goods.

In another embodiment of the present disclosure, a method for managing media content can include providing a user of a communication device with access to media content; obtaining a critique of the media content from the user in real-time; and providing a client associated with the media content with real-time access to the critique.

DETAILED DESCRIPTION

Figure 1:
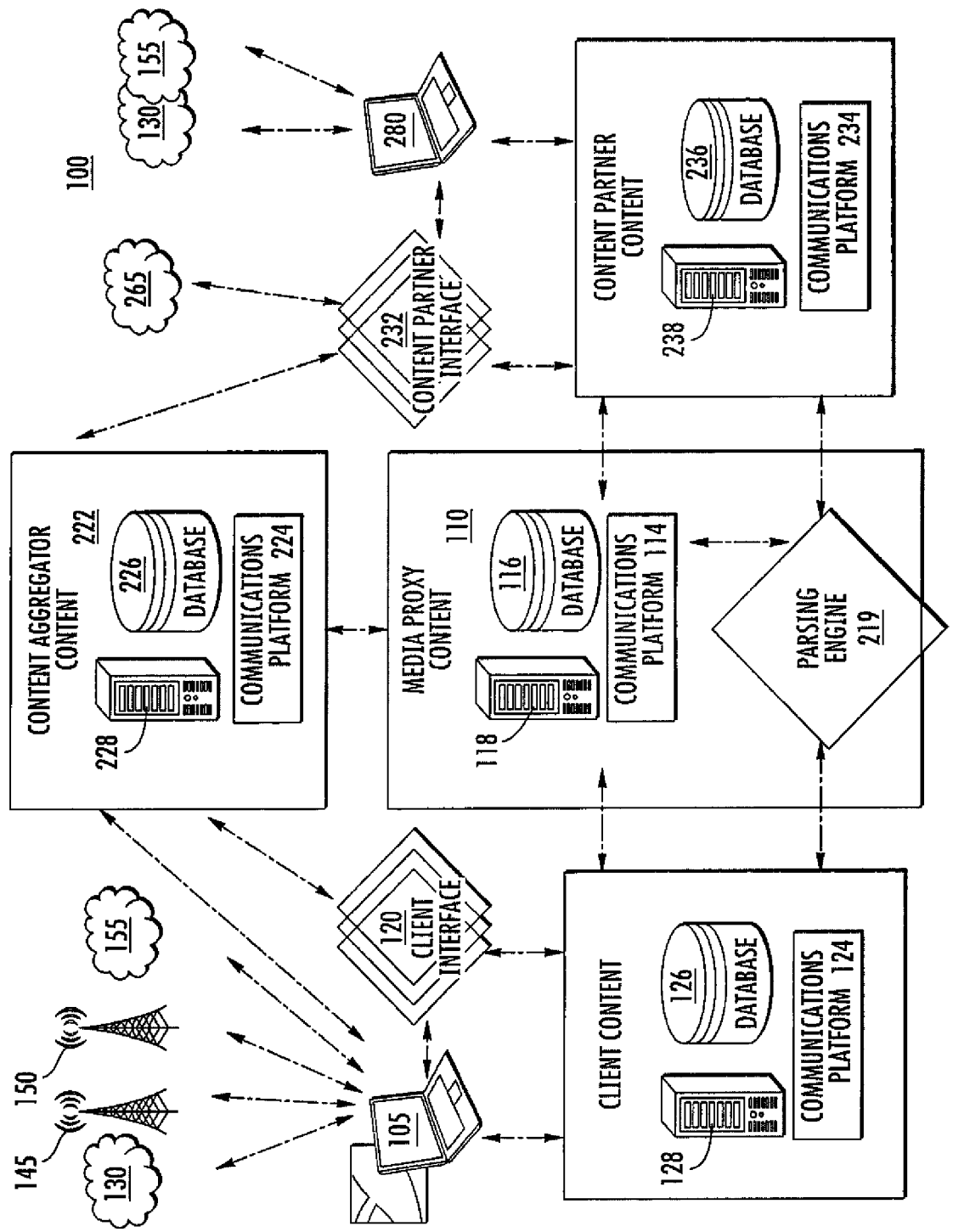
FIG. 1 depicts an exemplary embodiment of a communication system.

FIG. 1 depicts an exemplary embodiment of a communication system 100 employing communication devices 105 communicating by way of wireless access points (WAPs) and/or wired infrastructure with other communication devices, servers, network elements and/or a network proxy or web server, which collectively operate in the communication system 100. The communication devices 105 can be multimedia devices for communicating video, voice, text and/or data, as well as receiving multimedia programming, data, text and/or voice. For example, the communication devices 105 can include lap top or desktop computers, cellular phones, PDAs, set top boxes, and/or other devices that can communicate one or more of video, voice and data signals to a user, subscriber and/or consumer. The communication devices 105 can include various components and combinations of components that provide for the above-described communication, as well as other functions, such as, controllers, processors and memory. In one embodiment, the communication devices 105 can communicate in a multimode communication environment that can communicate via a number of modes of communication, including wired and/or wireless communication, as well as pursuant to various protocols.

The communication system 100 can include a media proxy 110 having a communications platform or interface 114 that utilizes common technology for communicating over an interface (e.g., an IP interface) with one or more of the communication devices 105 and/or one or more client systems or interfaces ("clients") 120, such as through use of a network 130, the cellular network 145, and/or a WiFi network 150. The media proxy 110 can further comprise a memory 116 (such as a high capacity storage medium) embodied in this illustration as a database, and a server, processor or controller 118 that makes use of computing technology such as a desktop computer, or scalable server for controlling operations of the media proxy.

The media proxy 110 can include various components and techniques for the processing and manipulation of data, including user data (e.g., demographics, content critiques, preferences and so forth) and client data (e.g., content, service and/or product being provided, preferences and so forth). The media proxy 110 can include a parsing engine 219 for processing of information provided by one or more of the communication devices 105, the clients 120, the content aggregator 222 and the content partner or provider interface 232. The parsing engine 219 can be utilized by media proxy 110 for transforming inputs into data structure suitable for later processing. The parsing engine 219 can be applied to various inputs, such as user critiques of media content. The media proxy 110 can also obtain and store keywords or other indicia associated with each of the clients 120. For example, the media proxy 110 can obtain, store and present to a user of communication device 105 the category headings used by a cleint 120 for storing various types of media content. The media proxy 110 can store or otherwise collect data from the end user's device 105 and a full record/inventory of the media itself from the content partner interface 232. When combined, a collection of analysis can be associated, and actionable information can be taken. The media proxy 110 can also be a pass through to reconcile redemption of reward points for goods/services provided by the content partner interface 232 and redeemable by the end user 105.

The clients 120 can be a software interface where the end user can interact with the media results as expressed directly or via a communication device 105. From here, an end user can view their accumulated points balance, view their media preferences and learn of new contests, media content and other events. The client interface 120 can provide a mirror reflection of the end user's preferences and desires, while the database 126 can communicate with the parsing engine 219 to seek out areas that would be of interest to the end user 105, providing the appearance of a personalized content offering based on user input from device 105. A communications platform or interface 124 can utilize common technology for communicating with the media proxy 110, such as through use of the network 130, the cellular network 145, and/or the WiFi network 150. The clients 120 can further have the memory 126 (such as a high capacity storage medium) embodied in this illustration as a database, and a server, processor or controller 128 that makes use of computing technology such as a desktop computer, or scalable server for controlling operations of the client system.

The network 130 can be a packet-switched network, such as an Internet Service Provider (ISP) network, and can be coupled to a network proxy (not shown), the cellular network 145, WiFi network 150, the media proxy 110, the one or more clients 120, and/or network elements. The ISP network 130 can utilize technology for transporting Internet traffic. Communications between the network proxy, the communication devices 105, the media proxy 110, the one or more clients 120 and other network elements of the communication system 100 can conform to any number of signaling protocols such as a session initiation protocol (SIP), SS7, or a video communications protocol which combines video and voice over a packet-switched network, as well as cryptographic protocols, such as transport layer security (TLS) or secure sockets layer (SSL), to provide secure communications for data transfers.

The network proxy (not shown) can comprise a communications interface that utilizes common technology for communicating over an IP interface with the communication devices 105, the media proxy 110, the one or more clients 120, the network 130, the cellular network 145, and/or the WiFi network 150. By way of the communications interface, the network proxy can direct by common means any of the foregoing network elements to establish packet switched data, voice, and/or video connections between communication devices 105, the media proxy 110 and the clients 120 distributed throughout the communication system 100. The network proxy can include memory (such as a high capacity storage medium), and a controller that makes use of computing technology such as a desktop computer, or scalable server for controlling operations of the network proxy. The network proxy can operate as an IP Multimedia Subsystem (IMS) conforming in part to protocols defined by standards bodies such as 3GPP (Third Generation Partnership Protocol) and beyond.

Under the control of the network proxy, linked packet-switched and circuit-switched technologies such as the cellular network 145, WiFi network 150 and the network 130, such as an ISP network, can communicate with one another. A media gateway can be used and can conform to a media gateway control protocol (MGCP) defined by work groups in the Internet Engineering Task Force (IETF) or by other means. This protocol can handle signaling and session management needed during a multimedia session. The protocol defines a means of communication that converts data from the format required for a circuit-switched network to that required for a packet-switched network. MGCP can therefore be used to set up, maintain, and terminate calls between multiple disparate network elements of the communication system 100. A media gateway can therefore support hybrid communication environments for the communication devices 105, including VoIP terminals.

A central office (not shown) can house common network switching equipment for distributing local and long-distance telecommunication services supplied by network 130 to the communication devices 105. Telecommunication services of the central office can include traditional POTS (Plain Old Telephone Service) and broadband services such as HDTV, DSL, VoIP (Voice over Internet Protocol), IPTV (Internet Protocol Television), Internet services, and so on. The communication system 100 can utilize common computing and communications technologies to support circuit-switched and/or packet-switched communications.

The cellular network 145 can support voice and data services over a number of access technologies such as GSM-GPRS, EDGE, CDMA-1X, UMTS, WiMAX, software defined radio (SDR), and other known and future technologies, including Near Field Communications (NFC) and beyond. The cellular network 145 and WiFi Network 150 can be coupled under a frequency-reuse plan for communicating over-the-air with other communication devices of the communication system, including communication devices 105.

The content aggregator 222 can be subscribed or collect a feed, or otherwise observe media content preferences (e.g., newly released songs, movies, video games, etc.) or access the media content (e.g., a web link). The aggregator 222 can provide the media content preferences at various intervals, including used-determined intervals. The content aggregator 222 can have podcasting capabilites to automatically download media files, such as MP3 recordings. The content partner 232 can provide automatic download media, playback the media within the application interface, or synchronize media content for the interaction by the communication device 105 and or dent interface 120. In one embodiment, the content aggregator 222 can aggregate text-only feeds and also distribute audio recordings and/or other binary content. Along various data paths, the end user preferences and/or access to content, such as through a link to the media content stored in a media source, can be provided. The data can be provided in various formats and approved for distribution to end user device 105. A record of activity as contained within content aggregator 222 can be stored in the client interface 120 as a history of activity, and content provider 232 for distribution and preference on an individual content basis.

The content aggregator 222 can have a communications platform or interface 224 that utilizes common technology for communicating over an interface (e.g., an IP interface or text messaging) with the media proxy 110, such as through use of the network 130, the cellular network 145, and/or WiFi network 150. The content aggregator 222 can further have a memory 226 (such as a high capacity storage medium) embodied in this illustration as a database, and a server or controller 228 that makes use of computing technology such as a desktop computer, or scalable server for controlling operations of the client system. The content aggregator 222 can be a separate device or sub-system of the communication system 100, or can be contracted out by a $3^{rd}$ party system, such as comprising the media proxy 222, including sharing one or more components with the media proxy. The content aggregator 222 can be a plurality of aggregators, such as aggregators based upon different network distribution types.

The content provider 232 can be one or more media sources and/or can be proxies that retrieve or access media content from other sources, including web-based searches. The content provider 232 can be used to provide the communication devices 105, the media proxy 110 and/or the clients 120 with access to the media content, such as through streaming, progressive download or full download. Various data paths can be provided for the media content and/or access to that content. Content partner interfaces 232 can be comprised of the sources for public distribution of content (e.g., radio, television, iTunes, etc.) and/or sources of originating content (e.g., media networks, record labels, movie houses, etc.). Storage of the content and/or its sources can be contained within database 236, which can influence whether the content has greater or lesser future distribution per the preferences originated on the end user devices 105.

The content provider 232 can have a communications platform or interface 234 that utilizes common technology for communicating over an interface (e.g., an IP interface) with the media proxy 110, such as through use of the network 130, the, the cellular network 145, and/or WiFi network 150. The content provider 232 can further have a memory 236 (such as a high capacity storage medium) embodied in this illustration as a database, and a server or controller 238 that makes use of computing technology such as a desktop computer, or scalable server for controlling operations of the client system. The content provider 232 can be a separate device or sub-system of the communication system 100, or can be incorporated with other components of the communication system, such as being incorporated into a client 232, including sharing one or more components with the client system. Communications between end user device 105, by way of content aggregator 222, and indicating a preference on the content stored in 236 can pass through the media proxy 110 and parsing engine 219.

Other data can be provided between two or more of the communication devices 105, the media proxy 110, the clients 120, the content aggregator 222 and the content provider 232. For example, data paths can provide for the transmittal of audience data, such as information collected by the media proxy 110 that is associated with feedback by a user corresponding to a particular media content (e.g., a song, movie, advertised product) or the transmittal of client data, such as client-sponsored activities, including concerts, contests or other events. In one embodiment, data paths can provide for the uploading of playlists by the client 120 from the media proxy 110, such as based upon a collection of critiques or evaluations of various media content by the users of communication devices 105. In another embodiment, communications originated via the client interface 120 can pass into the media proxy 110 by way of a data path. Communications originated by end user device 105 will pass into the media proxy 110 by way of the content aggregator 222 and the path of 260. Communications can be in the form of content preferences, accumulation and redemption of reward points and or any activities as allowed for interaction through the client interface 120.

As another example, data paths can provide for the transmittal of user or consumer data, such as the demographics or other information associated with the user (e.g., age, sex, income and so forth that can be maintained in a user profile), requests for feedback on media content (e.g., free one-time access to a song that the user can listen to at his or her leisure and provide feedback to earn points), the individual feedback by a user corresponding to a particular media content (e.g., a low-rated song that allows a radio station to adjust its programming accordingly), promotion of upcoming events corresponding to one or more of the clients 120, or user interaction with the media proxy 110, such as monitoring, redeeming or donating points awarded for media content critiques.

The user interaction with the media proxy 110 through use of the communication device 105 along the data paths can also include populating user playlists (e.g., with songs that the user has provided with a favorable critique), purchasing particular media content (e.g., for content that the user has provided with a favorable critique and desires to subsequently view and/or listen to), purchasing other goods or services (e.g., concert tickets, hard goods and so forth), blogging or otherwise communicating with other users (e.g., other users that have provided critiques similar to the users), and/or participating in contests or other events (e.g., an auction that accepts the user's points as payment or a media content-related quiz show that awards points). Contests, events, and so forth can be based on the availability and participation by the content partners who make their presence known on client interface 120 via content partner interface 232. The contests may or may not have any connection to the content that is being distributed to the end user for their reaction through the content aggregator 222. They can be instead, a secondary program solely based on providing a new means of distribution (e.g., live) and allowing and/or rewarding access to such an experience through their normal interaction with the media proxy 110.

Data paths, such as through use of device 280, can be used for originating various media content directly from the content provider 232 towards the user of the communication device 105, including from the client 120 where the content provider is associated with the client. Data paths can also be used for providing the various media content indirectly from the content provider 232 to the user of the communication device 105, such as where the media proxy 120 stores the media content or otherwise provides the access thereto.

Communication between two or more of the devices 105, the content partner interface 232, the media proxy 110, the content aggregator 222 and the client interface 120 can be achieved by other means, including other networks 155, such as a virtual private network. Similarly, other connection points or techniques 265 can be used for providing data flow between the content partner interface 232 and the content aggregator 222.

Figure 2:
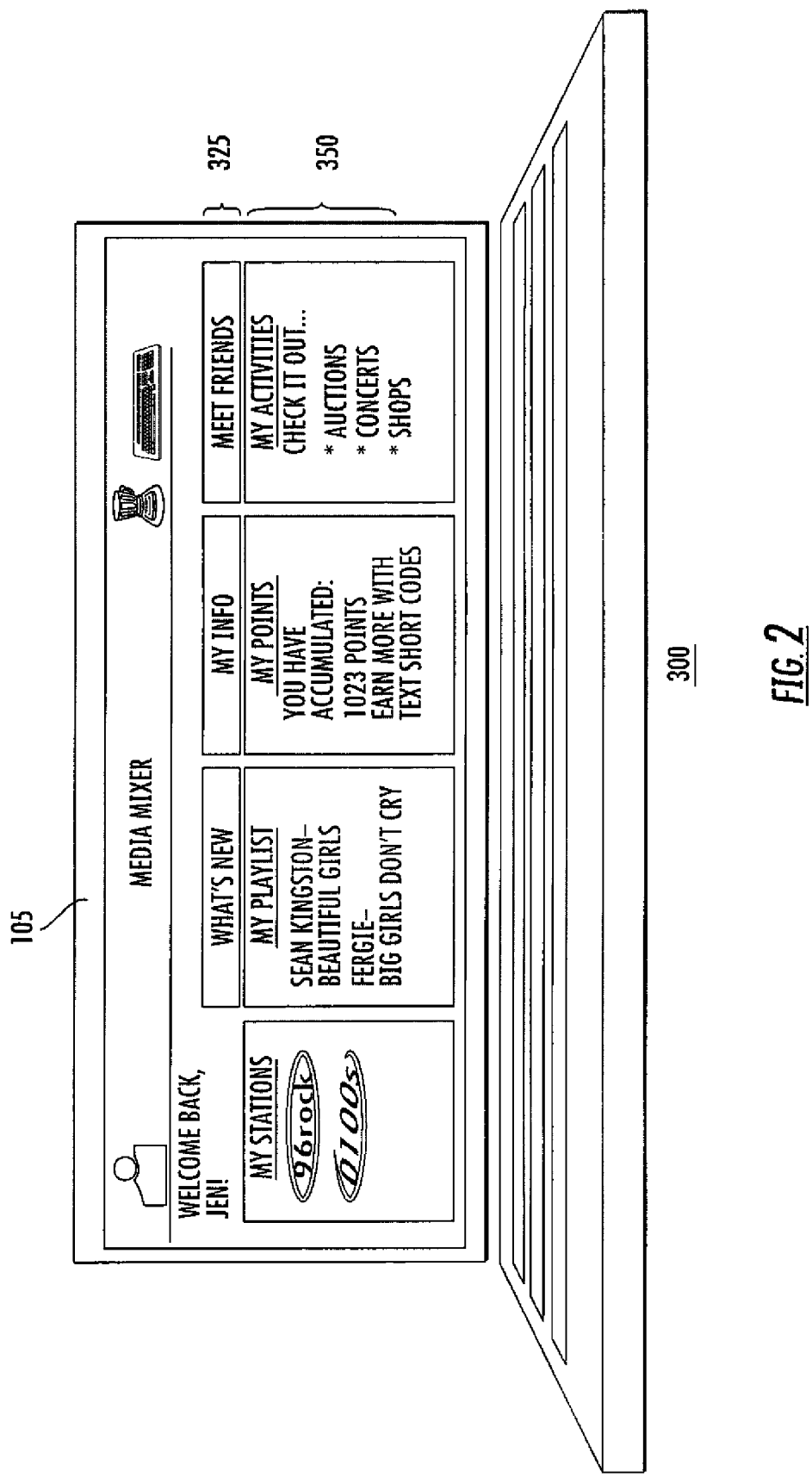
FIG. 2 depicts a graphical user interface for a consumer in the communication system of FIG. 1.

Referring to FIG. 2, a graphical user interface (GUI) 300 is shown for a user of a communication device 105 and represented as the client interface 120, which in this exemplary embodiment is a lap top computer providing a web portal. GUI 300 can present a content push tool bar 325 that allows a user to navigate through new information, user information, and communication with other users. GUI 300 can also present a content pull toolbar 350 that allows a user to navigate through favorite media sources, playlists, points, and activities based on usage and preferences. Pull content can include ways to provide personalization of end user details, a way to initiate finding friends and to preference content distribution (e.g., TV & radio stations). The push content can include receiving feedback on activities, such as playlist creations based on likes/dislikes recorded via the content aggregator 222, information on new content that is similar to preferred likes, accumulation of points/rewards for redemption and updates on activities, such as concerts, auctions, and so forth for end user participation.

Figure 3:
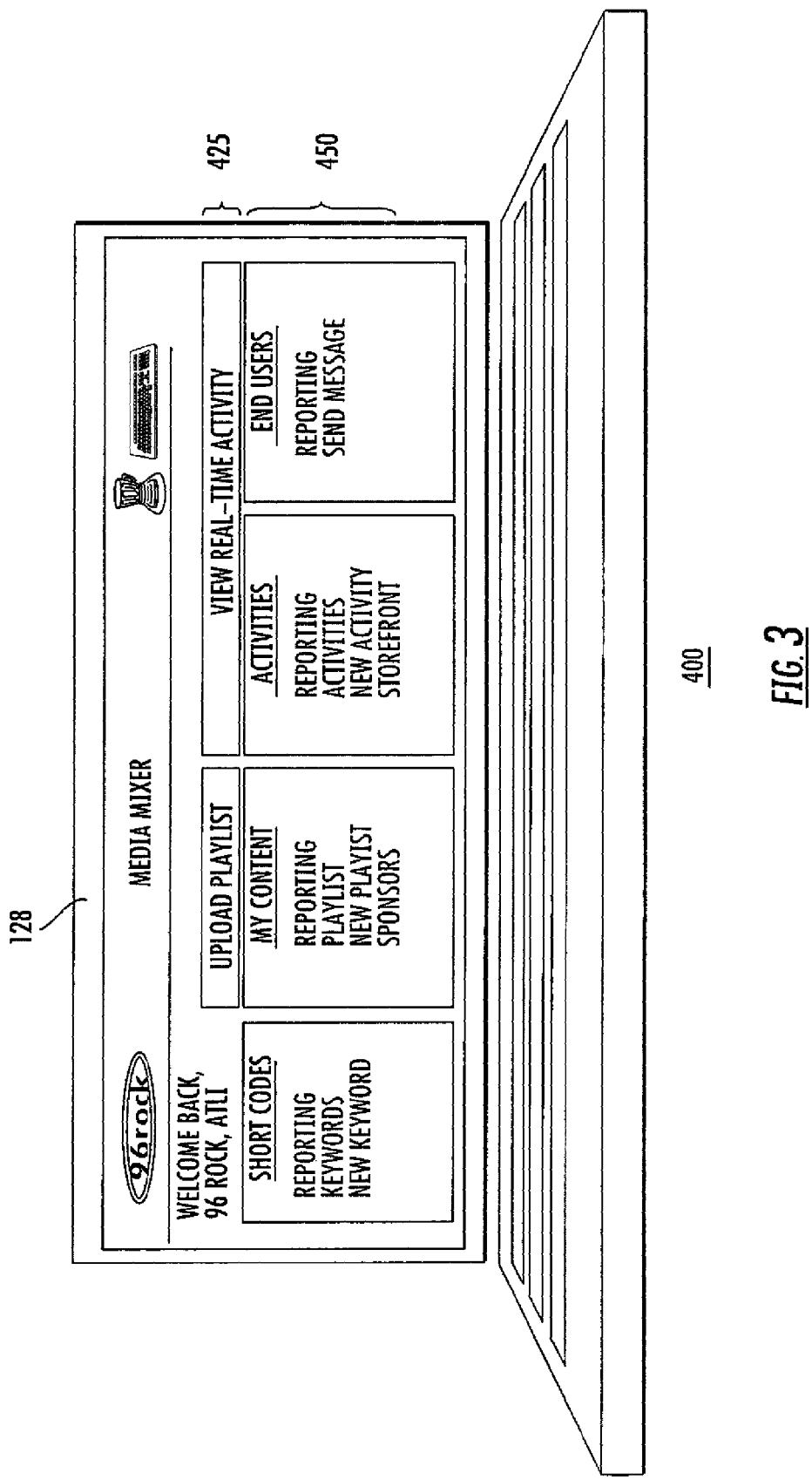
FIG. 3 depicts a graphical user interface for a content partner client in the communication system of FIG. 1.

Referring to FIG. 3, a graphical user interface (GUI) 400 is shown for a content partner interface 232, which in this exemplary embodiment is utilizing a lap top computer providing a web portal. GUI 400 can present a content pull tool bar 425 that allows the content originator or distributor 232 to navigate through playlist monitoring via real-time activity associated with the client and observing one or more users or consumers and pull reporting. GUI 400 can also present a content push toolbar 450 that allows a content originator and/or distributor to initiate new keywords for the particular user of the communication device, and offer new media content, and contests/activities for interaction. The toolbar 450 can also allow for navigation through activities including reporting, descriptions of the activities, descriptions of new activities and merchandising. The toolbar 425 can additionally allow for navigation through identifiers of users associated with the communication devices 105 (e.g., names, addresses and so forth) that can include reporting and sending messages.

Figure 4:
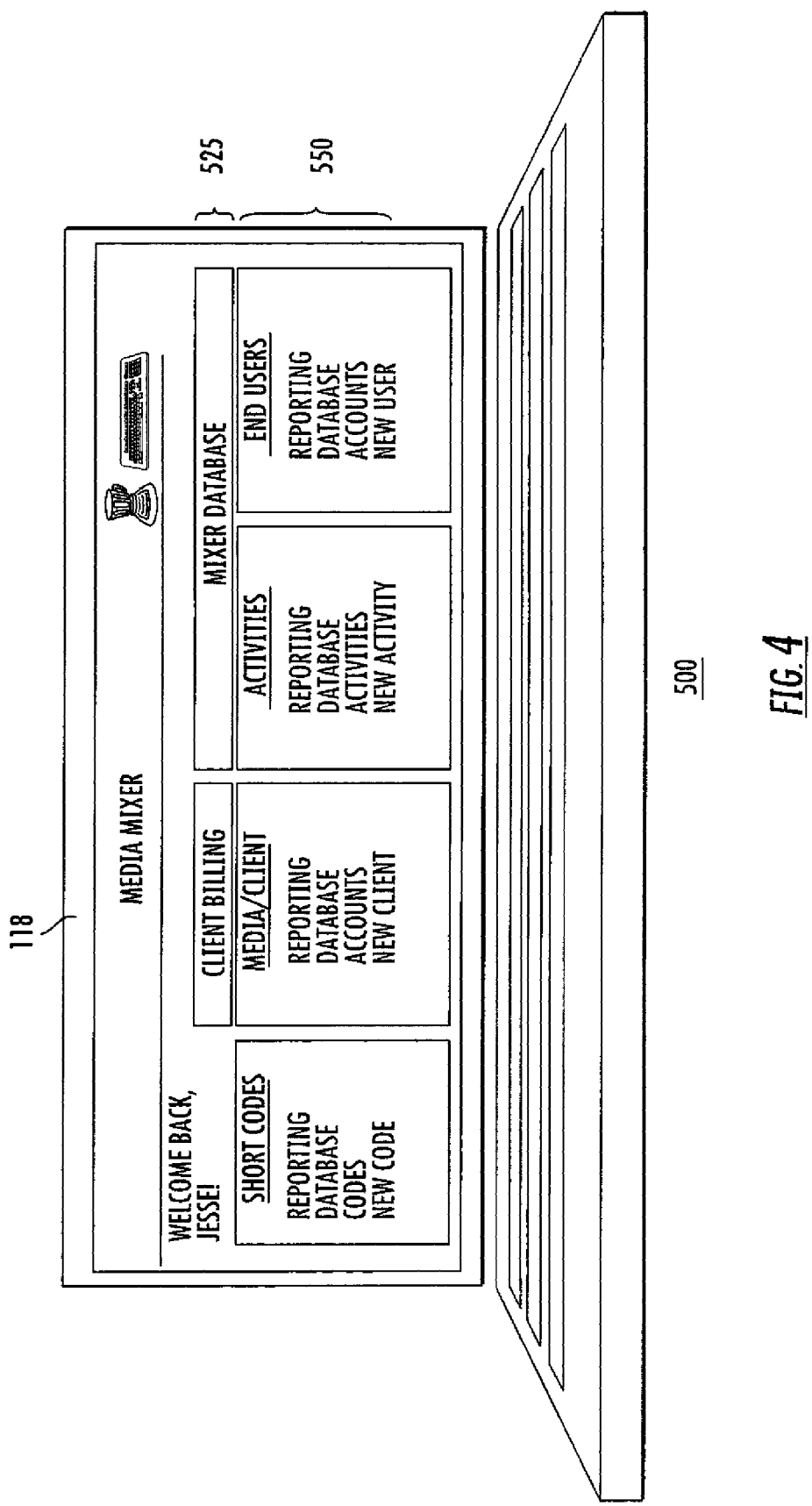
FIG. 4 depicts a graphical user interface for an administrator in the communication system of FIG. 1.

Referring to FIG. 4, a graphical user interface (GUI) 500 is shown for an administrator of media proxy 110, which in this exemplary embodiment is utilizing a lap top computer providing a web portal. GUI 500 can present a content push tool bar 525 that allows the administrator to navigate through client billing and the proxy database. GUI 500 can also present a content pull toolbar 550 that allows a user to navigate through identifiers of the communication devices 105 (e.g., short codes) that can include reporting, description of associated databases, description of codes and description of new codes, and identifiers of clients that can include reporting, description of associated databases, description of accounts and description of new clients. The toolbar 550 can also allow for navigation through activities including reporting, descriptions of associated databases, descriptions of the activities, and descriptions of new activities. The toolbar 450 can additionally allow for navigation through identifiers of users associated with the communication devices 105 (e.g., names, addresses and so forth) that can include reporting, description of associated databases, description of accounts and description of new users. FIG. 500 shows an administrative function that can view all content communicating throughout the media proxy 100 with limited interaction. The main function is to control the business model of the media proxy 110, as well as control the interaction of the content originators/distributors 232 and shut down an end user 105 due to excessive use/abuse.

Figure 5A:
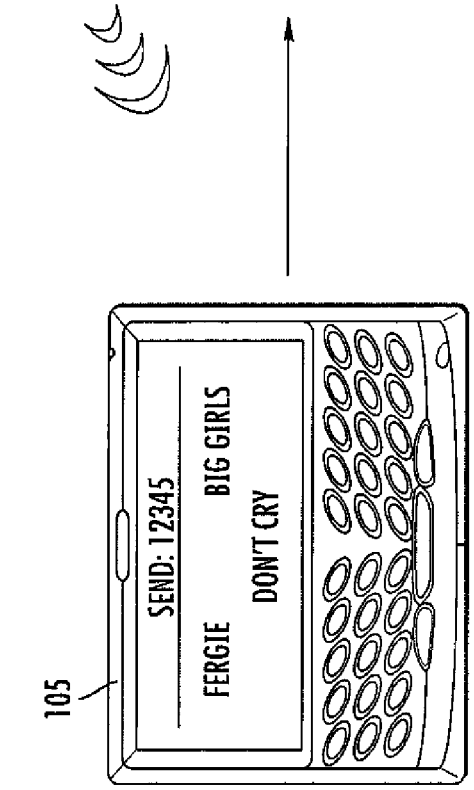
FIGS. 5*a* through 5*d* depict an exemplary method operating in portions of the communication system of FIG. 1
Figure 5B:
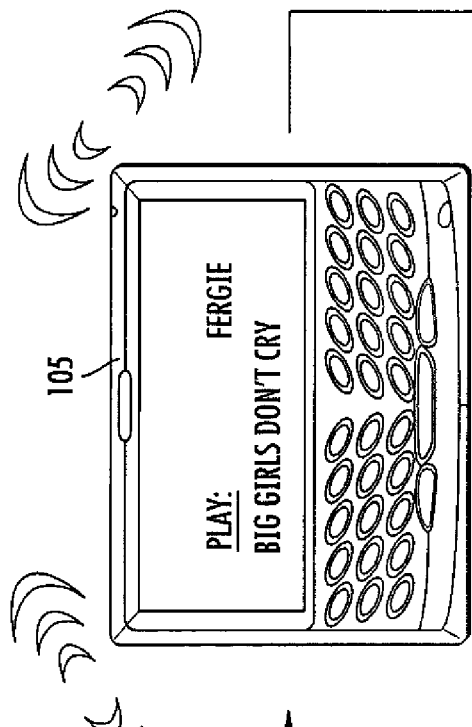
Figure 5C:
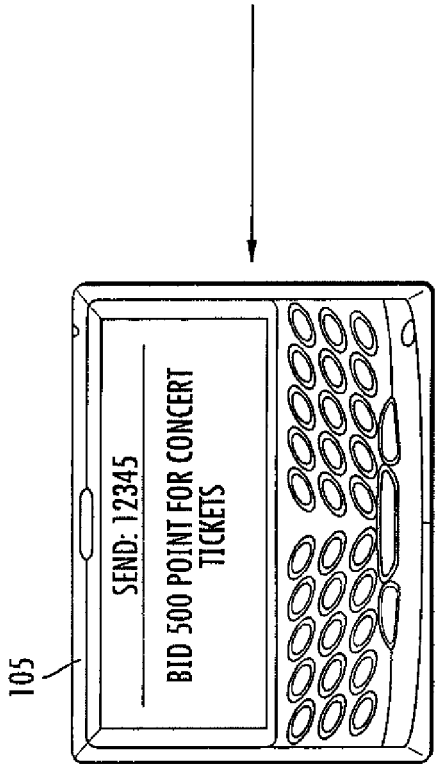
Figure 5D:
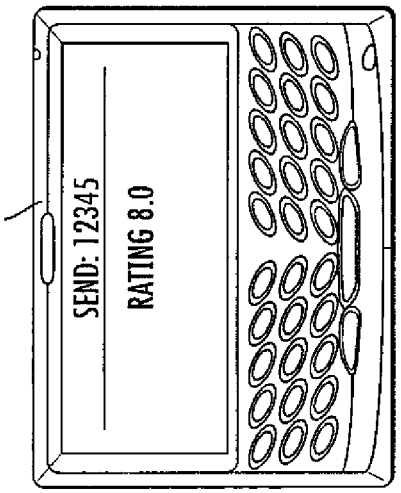

FIGS. 5a through 5d depict an exemplary method 600 utilizing a communication device 105 (e.g., a PDA, consumer device, etc.), and operating in portions of the communication system 100. In FIG. 5a, a user can send a text message using a predefined short code to download or otherwise access/interact with media content, such as provide a song preference, suggest a song for airtime, or receive an MP3 of the song for review. The request for the media content can be in response to a message sent from the media proxy 110 or can be initiated by the content distributor/originator, or by the end user such as in response to hearing a portion of the song on the radio or reading about a newly released song in a magazine. In FIG. 5b, the user can play the song at the time and place he or she desires to listen to and review the song. In FIG. 5c, the user can send a message to the media proxy 110 that includes the critique or review of the song. For example, the critique can be a simple like or dislike that is selected from a selection presented on the communication device 105 or is typed into the text message. Other critiques can also be provided, such as ratings on a scale or a written evaluation. In response to the review or critique of the media content, the user of the communication device 105 is awarded points. In FIG. 5d, the user can utilize those points, such as bidding for concert tickets during an auction.

Additional data flow can occur as required by the content aggregator 222 per the guidelines outlined by the Mobile Marketing Association. Data flow can vary based on the needs of the content creator/distributor 232 and what they are trying to accomplish with the end user 105.

The embodiments described herein can provide for real-time or near real-time data flow between the various entities, such as the users, distributors and/or originators. For example, a user can listen to a particular media content and then provide feedback at his or her convenience, which includes immediately or at a later time. This can allow a user to have real-time access to the media content and real-time access to providing the feedback or critiques of the media content. The real-time access can extend to the originator, distributor or the media proxy 110 for receiving and reviewing the critiques of the media content.

The embodiments described herein allow a user, client or other entity to find out what song or show is currently being played. For example, a user can send a text message or other signal requesting identification information for the media content that is currently being played. The identification information can be provided in real-time or near real-time. In another embodiment, a user, client or other entity can obtain identification information for previously played media content. For example, a user can send a text message or other signal to media proxy 110 requesting identification information for a song that was played ten minutes ago. This allows users who do not have immediate access to a communication device to know what media content has been played, such as if they heard it from someone else's communication device. The time period and the number of media contents identified can vary for the identification information provided. In yet another embodiment, a user can purchase media content, such as songs or movies, directly from a play list associated with a content provider. The provider, such as a TV station, can have restrictions for selling the content, such as age-based ratings.

Upon reviewing the aforementioned embodiments, it would be evident to an artisan with ordinary skill in the art that said embodiments can be modified, reduced, or enhanced without departing from the scope and spirit of the claims described below. For example, the content partner/distributor can be charged a fee with the option for premium activities for the end user as well. In one embodiment, the fee can be adjusted (e.g., reduced or eliminated) based upon the amount of participation in critiques, activities or other data generating activity. The media proxy 110 can monitor other user activity to generate data for clients. For example, links to merchandising can be provided and user preference data can be obtained based upon accessing those links or purchases made from the websites associated with the links (e.g., data transmitted from the website confirming a purchase was made). The requests for critiques can be directed to particular users based upon information in their user profiles.

In another embodiment, embedded signals can be provided in the media content as a trigger for the user. For example, a communication device 105 can detect an embedded signal in a song which triggers a request for feedback that is generated by the device 105.

These are but a few examples of modifications that can be applied to the present disclosure without departing from the scope of the claims. Accordingly, the reader is directed to the claims section for a fuller understanding of the breadth and scope of the present disclosure.

In another embodiment not shown, the communication system 100 of FIG. 1 can employ an IPTV broadcast media architecture, including at least one super head office server (SHS), one or more video head servers (VHS) and one or more video head offices (VHOs). The IPTV broadcast media architecture can be overlaid or operably coupled with communication system 100 as another representative embodiment of communication system 100. The SHS can receive national media programs from satellite and/or media servers from service providers of multimedia broadcast channels, and can forward IP packets associated with the media content to the VHS via a network of VHOs according to a common multicast communication method. The VHS can then distribute multimedia broadcast programs to a media receiver, such as through set-top boxes associated with televisions located in homes. Unicast traffic can also be exchanged between the media receivers and subsystems of the IPTV media system for services, such as video-on-demand (VoD).

In another embodiment not shown, the communication system 100 of FIG. 1 can employ a IP Multimedia Subsystem (IMS) network architecture. The IMS network architecture can be overlaid or operably coupled with communication system 100 as another representative embodiment of communication system 100. The IMS network architecture can include a Home Subscriber Server (HSS), a tElephone NUmber Mapping (ENUM) server, and network elements of an IMS network. The IMS network can be coupled to IMS compliant communication devices (CD) or a Public Switched Telephone Network (PSTN) CD using a Media Gateway Control Function (MGCF) that connects the call through a common PSTN network. The CDs can be fixed, mobile, wireless and/or wired devices.

The present disclosure contemplates the use of a machine in the form of a computer system within which a set of instructions, when executed, may cause the machine to perform any one or more of the methodologies discussed above. In some embodiments, the machine can operate as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine can comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure can include broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system can include a processor (e.g., a central processing unit (CPU), a graphics processing unit (GPU, or both), a main memory and a static memory, which communicate with each other via a bus. The computer system can further include a video display unit (e.g., a liquid crystal display (LCD), a flat panel, a solid state display, or a cathode ray tube (CRT)). The computer system can include an input device (e.g., a keyboard), a cursor control device (e.g., a mouse), a mass storage medium, a signal generation device (e.g., a speaker or remote control) and a network interface device.

The mass storage medium can include a computer-readable storage medium on which is stored one or more sets of instructions (e.g., software) embodying any one or more of the methodologies or functions described herein, including those methods illustrated above. The computer-readable storage medium can be an electromechanical medium such as a common disk drive, or a mass storage medium with no moving parts such as Flash or like non-volatile memories. The instructions can also reside, completely or at least partially, within the main memory, the static memory, and/or within the processor during execution thereof by the computer system. The main memory and the processor also may constitute computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure also contemplates a machine readable medium containing instructions, or that which receives and executes instructions from a propagated signal so that a device connected to a network environment can send or receive voice, video or data, and to communicate over the network using the instructions. The instructions can further be transmitted or received over a network via the network interface device. While the computer-readable storage medium is described in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a computer-readable storage medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for receiving feedback on media content, the method comprising:

providing a user of a communication device with a request for a critique of media content via the communication device, wherein the request for the critique of the media content is sent to the communication device of the user based on user preferences for content distribution in a user profile associated with the user;

providing, via the communication device, the user with access to the media content for which the critique is requested, wherein the user is provided access to the media content in response to the user accepting the request for the critique of the media content;

receiving, from the communication device, the critique of the media content from the user, wherein the critique of the media content comprises a text message commenting on the media content that is entered by the user via the communication device;

adjusting programming of media content to be broadcast based on the critique of the media content received from the user; and further comprising uploading a playlist from a media proxy, wherein the playlist is based on the critique of the media content and a critique of other media content.

2. The method of claim 1, further comprising awarding points to the user based upon the user performing the critique of the media content, and further comprising awarding other points based upon user participation in activities managed by a media server.

3. The method of claim 2, wherein the activities comprise contests.

4. The method of claim 2, wherein the activities comprise auctions.

5. The method of claim 2, further comprising providing real time updates indicating an accrual of the points awarded to the user.

6. A method for receiving feedback on media content, the method comprising:
  providing, via a hand-held communication device, a user of the hand-held communication device with a request for a critique of media content being broadcast by a radio or television station, wherein the request for the critique of the media content being broadcast is sent to the hand-held communication device of the user based on user preferences for content distribution in a user profile associated with the user;
  receiving, from the hand-held communication device, the critique of the media content being broadcast from the user, wherein the critique of the media content being broadcast comprises feedback on the media content being broadcast that is entered by the user via the hand-held communication device; and
  further comprising providing a content push toolbar that enables a content originator to initiate a keyword for the user of the hand-held communication device.

7. The method of claim 6, further comprising adjusting programming of media content to be broadcast based on the critique of the media content received from the user.

8. The method of claim 6, further comprising awarding points to the user based upon the user performing the critique of the media content being broadcast, and further comprising awarding other points based upon user participation in activities managed by a media server.

9. The method of claim 6, wherein the hand-held communication device allows the user to initiate finding of friends.

10. The method of claim 6, wherein the feedback on the media content being broadcast comprises a text message commenting on the media content being broadcast that is entered by the user via the hand-held communication device.

11. The method of claim 6, wherein the feedback on the media content being broadcast comprises a selection from a plurality of options presented to the user via the hand-held communication device.

* * * * *